Patented Mar. 12, 1940

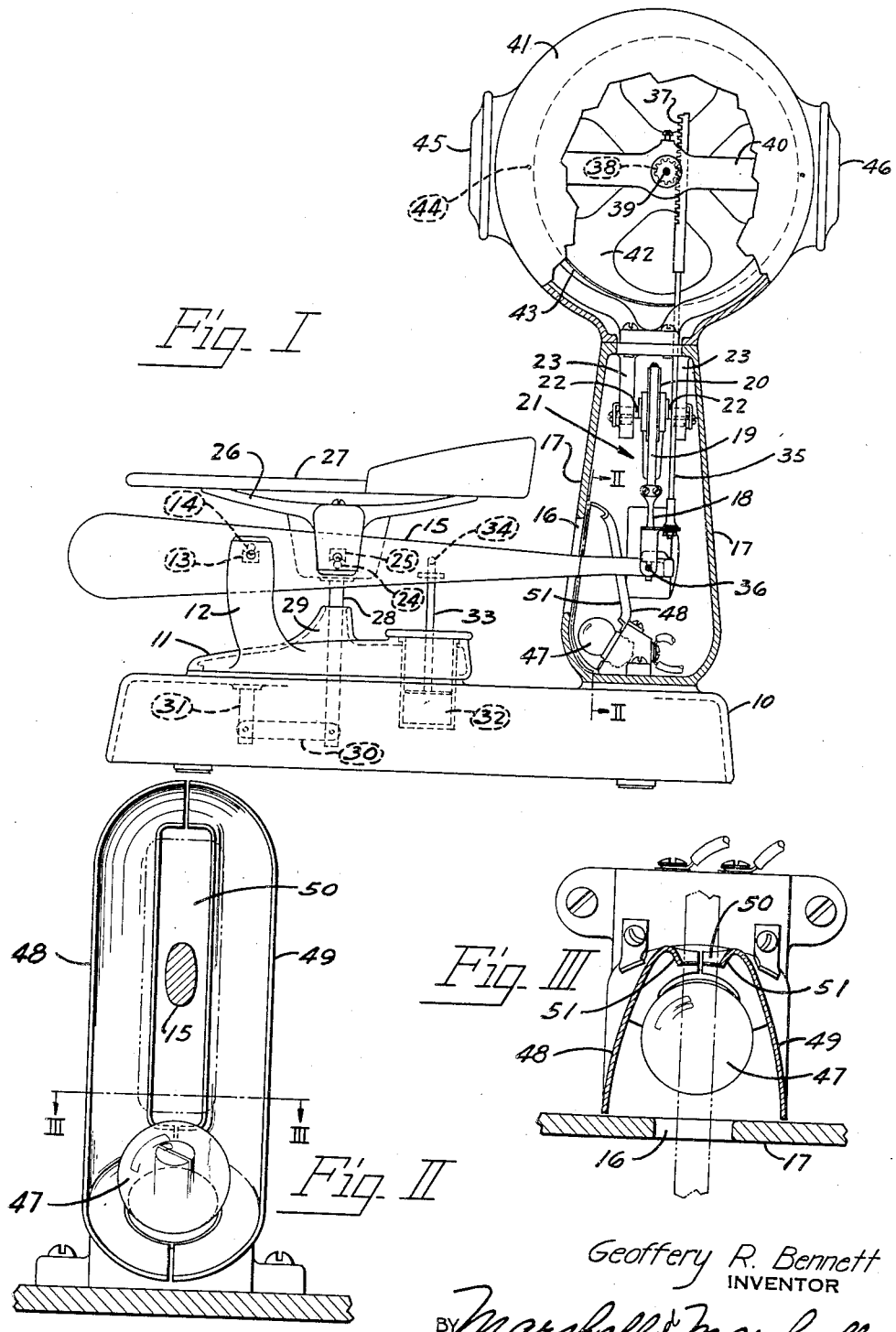

2,193,669

UNITED STATES PATENT OFFICE 2,193,669

WEIGHING SCALE

Geoffrey R. Bennett, Toledo, Ohio, assignor to Toledo Scale Manufacturing Company, Toledo, Ohio, a corporation of New Jersey Application June 17, 1938, Serial No. 214,276

7 Claims. (Cl. 265—27)

This invention relates to improvements in weighing scales used in retail shops, particularly in tropical or subtropical countries where there are numerous insects which may enter the scale housing and interefere with the proper operation of the device.

One of the principal objects of this invention is the provision of means for preventing the access of insects to the interior of the scale.

Another object is the provision of improved means accomplishing the above objects in a manner that does not add friction to the operation of the scale.

These, and other objects and advantages will be apparent from the following description in which reference is had to the accompanying drawing, illustrating a preferred embodiment of the invention and in which similar reference numerals designate similar parts throughout the several views.

Referring to the drawing:

Fig. I is a side elevational view of a weighing scale embodying the invention.

Fig. II is an enlarged, front elevational view of a non-physical insect barrier substantially as seen from along line II—II of Fig. I; and, Fig. III is a plan view thereof, sectioned substantially along the line III—III of Fig. II.

In certain localities insects, such as cockroaches and flies, cause considerable annoyance and actual damage by entering the interior of weighing scales. Cockroaches are omnivorous and they greedily attack the electrical insulation of wires in the interior of the scale and other nonmetallic material used in its construction such as leather or rubber gaskets and silk index threads. They may also become wedged between relatively movable scale members and thus cause inaccurate indications. Flies and other insects also are objectionable for the latter reason, and in addition they are apt to soil the reading face of the chart.

The scale per se to which the device embodying the invention is shown attached is well known in the art and fully illustrated and described in Patent 1,166,128 to Hapgood and, therefore, it is described herein only in so far as is necessary to fully disclose the instant invention.

Referring to the drawing in detail:

A hollow base 10 has attached to its upper surface, near one of its ends, a frame 11 from which horns 12 extend upwardly. These horns are provided in their upper ends with bearings 13 in which fulcrum pivots 14 of a load supporting lever 15 are oscillatably mounted. The free end of this lever 15 extends through an opening 16 into a chamber of an upwardly extending housing 17 securely fixed to the opposite end of the base 10. A pivot in this inwardly extending portion of the lever 15 engages a suitable bearing in a stirrup 18 which is suspended from the lower end of a flexible metallic ribbon 19 overlying an arcuate face of a power sector 20 forming a part of a load counterbalancing pendulum 21 which, by means of laterally extending pivots 22, is fulcrumed in downwardly extending brackets 23 which are functionally integral with the upper end of the housing 17. In spaced relation to the fulcrum pivots 14 in the lever 15 are load pivots 24 oscillatably supporting bearings 25 of a load supporting frame 26. For the purpose of receiving the load to be weighed a platter 27 is secured to the frame 26. To maintain the condition of level of the load supporting platter a stem 28, dependingly secured therein, projects through a hollow boss 29 cast integral on the frame 11. The lower end of this stem 28 engages one end of a check link 30 whose other end pivotally engages a check link stud 31 secured to the base 10. Although not shown, the necessary adjusting means are provided to obtain the necessary accuracy of the force parallelogram.

To dampen the vibration of the scale mechanism in a manner that is well known a dashpot 32 is mounted in the frame 11, extending through an aperture in the base into its hollow interior. A stem 33 of its plunger pivotally engages the lever 15 at 34.

It is well known that a load counterbalancing pendulum will deflect through an angle which corresponds to the weight of the load on the load receiver and to translate this angle, in terms of weight, an upwardly extending rod 35 pivotally engages at 36 the end of the lever within the housing 17, and teeth of a rack 37 secured to the upper end of the rod 35 engage teeth of a pinion 38 seated on a horizontally extending chart shaft 39 mounted in antifriction ball bearings (not shown) in brackets 40 extending across the ends of a cylindrical casing 41. Also fixed to the chart shaft 39 is a series of chart frames 42 which are enveloped by a cylindrical chart 43 of light material upon which weight and value indicia are printed.

When a load is placed on the load receiver 27 the end of the lever is downwardly deflected until the weight moment of the pendulum balances the weight moment of the load which partakes of the movement of the lever. The rack 37, with the cooperation of the pinion 38, revolves the chart 43 until the proper weight indicium printed on its face is in coincidence with a silk indicating thread 44 stretched closely adjacent its face and parallel to its turning axis. Windows 45 and 46 are provided in the casing 41 so that the indication may be observed by both the merchant and the customer.

Since the opening 16, through which the lever 15 enters the housing 17, is of considerable size so as not to interfere with the action of the lever, it forms a ready entrance for cockroaches, flies and other insects. There are many different species of cockroaches ranging from the Blatta Orientalis found in the tropics and subtropics, which attain a length up to 2½ inches, to the more common *Periplaneta americana* and the *Blattella germanica* prevalent in this country, specimens of the latter species attain a length of only approximately ⅜ of an inch. Attempts have heretofore been made to prevent cockroaches from entering scales by making the clearances between the edges of openings and the operating parts as small as possible, for example, by the means shown in U. S. Patent 1,837,548 to H. O. Hem; but regardless of the smallness of the clearance immature cockroaches of the larger species or members of the smaller species will still find an entrance through the small cracks.

All cockroaches however, regardless of species, are nocturnal in habit and will not enter brightly lighted spaces. According to the present invention a non-physical barrier is erected in back of the opening 16 comprising an electric light 47 which is mounted directly beneath the slot 16 out of the way of the lever in such a manner that the light emanating therefrom is reflected towards the opening by a pair of highly polished reflector members 48 and 49. Cockroaches cannot adhere to a smooth surface and even if they enter the housing through the opening 16 at a time when the lamp 47 is not lighted they cannot get a foothold to crawl through an opening 50, formed by the two reflectors 48 and 49, through which the lever 15 passes into the interior of the scale. The reflectors 48 and 49 are preferably so designed and shaped so that the major portion of the light is reflected into the opening 16.

It has been observed that flies and other insects will not crawl over a relatively sharp edge, a characteristic that is taken advantage of in the construction of fly traps, and for this reason the inner edges of the reflector members 48 and 49 which define the slot 50 are bent at a relatively sharp angle at 51 (see Fig. III).

Since the lamp 47 to be effective must burn continuously a saving in the consumption of electric current will be achieved by utilizing a so-called "glow light" for the lamp 47, these consume only a fraction of a watt per hour. In lamps of this kind two unconnected electrodes ionize the surrounding gaseous atmosphere which becomes luminous. It will be readily understood that any electric light may be used at a slightly higher operating cost.

Although the invention is shown herein in combination with a scale of the cylinder type in which there is an otherwise unprotected opening into the interior of the scale all other types of scales, for example, such as the "box type" shown in Patent 2,066,624 to H. W. Hem or scales of the "fan type" as shown in Patent 1,313,614 to J. L. Theobald may be similarly protected by suitably designing the reflectors.

The embodiment of the invention herein shown and described is therefore to be regarded as illustrative only and it is to be understood that the invention is susceptible to variation, modification and change within the spirit and scope of the subjoined claims.

Having described the invention, I claim:

1. In a device of the class described, in combination, a weighing scale comprising a housing, cooperative mechanism stationed within and without said housing, there being an opening in said housing for the passage therethrough of a portion of said mechanism stationed without said housing, and a chamber having light reflecting walls interiorly of said housing surrounding said opening, there being a second opening in said light reflecting walls for the passage therethrough of said portion of said exteriorly stationed scale mechanism, the walls defining said second opening being sharply bent inwardly and having relatively sharp edges.

2. In a device of the class described, in combination, a weighing scale comprising a housing, load counterbalancing mechanism stationed within said housing, load receiving means stationed without said housing, there being an opening in said housing for the passage therethrough of a portion of said load receiving means stationed without said housing, a "glow light" stationed adjacent said opening and illuminating said opening when said weighing scale is not in use and reflecting means so formed so as to reflect the major portion of light emanating from said "glow lamp" into said opening.

3. In a device of the class described, in combination, a weighing scale comprising a housing, load counterbalancing mechanism stationed within and load receiving means stationed without said housing, there being an opening in said housing for the passage therethrough of a portion of said load receiving means, an electric light stationed adjacent said opening and illuminating said opening when said weighing scale is not in use, and reflecting means so formed so as to reflect the major portion of light emanating from said electric light into said opening.

4. In a weighing scale, in combination, a hollow member, there being an opening in said member, a movable scale part passing through said opening, a light emanating means stationed adjacent said opening in the interior of said chamber, a reflector stationed adjacent said light emanating means for reflecting light into said opening, said reflecting means being so designed and shaped so as to provide an opening for the passage therethrough of said relatively movable scale part and said opening in said reflecting means being defined by relatively sharp, inwardly bent edges.

5. In a weighing scale, in combination, a hollow member, there being an opening in said member, a movable scale part passing through said opening, a light emanating means stationed adjacent said opening in the interior of said chamber and a reflector stationed adjacent said light emanating means for reflecting light into said opening, said reflecting means being so designed and shaped so as to provide an opening for the passage therethrough of said relatively movable scale part.

6. In a weighing scale, in combination, a hollow member, there being an opening in said member, a movable scale part passing through said opening, a light emanating means stationed adjacent said opening in the interior of said member and illuminating said opening when said weighing scale is not in use, and a reflector stationed adjacent said light emanating means for reflecting light into said opening.

7. In a weighing scale, in combination, a hollow housing, an opening into said housing from the exterior of the scale, a movable scale part passing through said opening, and a light emanating means stationed immediately adjacent said opening in the interior of said housing and active to illuminate said opening when said weighing scale is not in use, to provide a brilliantly illuminated region immediately adjacent said opening for frightening away exploring insects.

GEOFFREY R. BENNETT.